United States Patent [19]
Eto et al.

[11] Patent Number: 5,301,031
[45] Date of Patent: Apr. 5, 1994

[54] SCANNING CONVERSION DISPLAY APPARATUS

[75] Inventors: Masahiro Eto, Fujisawa; Nobuaki Kabuto; Mitsuo Tanaka, both of Yokohama, all of Japan

[73] Assignee: Hitachi Ltd., Tokyo, Japan

[21] Appl. No.: 938,514

[22] Filed: Sep. 2, 1992

Related U.S. Application Data

[63] Continuation of Ser. No. 468,912, Jan. 23, 1990.

[51] Int. Cl.⁵ .................. H04N 5/74; H04N 7/01
[52] U.S. Cl. ...................... 348/792; 348/791; 348/469
[58] Field of Search ............ 358/140, 11, 135, 136, 358/59, 137, 240, 241, 230, 236, 160, 171, 178, 172, 21 R; H04N' 11/20, 7/1, 5/46, 5/66, 9/12, 5/74

[56] References Cited

U.S. PATENT DOCUMENTS

| | | | |
|---|---|---|---|
| 4,694,348 | 9/1987 | Kamiya et al. | 358/236 |
| 4,789,899 | 12/1988 | Takahashi et al. | 358/236 |
| 4,942,458 | 7/1990 | Miyajima et al. | 358/59 |
| 5,003,388 | 3/1991 | Schirochi et al. | 358/11 |

FOREIGN PATENT DOCUMENTS

| | | | |
|---|---|---|---|
| 62-53989 | 11/1987 | Japan | H04N 5/66 |
| 0284185 | 11/1989 | Japan | H04N 5/460 |

Primary Examiner—Victor R. Kostak
Assistant Examiner—Michael H. Lee
Attorney, Agent, or Firm—Antonelli, Terry, Stout & Kraus

[57] ABSTRACT

A display apparatus using a matrix display panel, such as a liquid crystal panel, for converting the number of scanning lines to be displayed to a number that can be accommodated on a panel having a smaller number of scanning lines. The apparatus includes a control circuit which produces control signals in synchronism with the input video signal, horizontal and vertical scanning circuits each including a shift register operated by the control circuit, and a display panel which is formed of a matrix arrangement of pixels that are driven selectively by the scanning circuits. The apparatus further includes a circuit which halts the operation of the vertical shift register at a certain interval within the effective scanning period of the vertical scanning circuit so as to extract vertical shift clocks, thereby removing the vertical shift clocks within the effective display period of the video signal, thereby extracting periodically extracting scanning lines.

4 Claims, 12 Drawing Sheets

SCANNING CONVERSION DISPLAY APPARATUS

This application is a continuation of application Ser. No. 468,912, filed on Jan. 23, 1990.

BACKGROUND OF THE INVENTION

The present invention relates to a display apparatus using a matrix display panel such as a liquid crystal panel, and particularly to a scanning conversion display apparatus having a matrix display panel suitable for displaying a picture with a larger number of scanning lines as compared with the number of displayed scanning lines.

Among various color television systems, three systems including NTSC system, PAL system and SECAM system have dominated the world markets. Recently, the "high-vision" system which offers high quality pictures entered a phase of experimental broadcasting, and the variety of color television systems is going to increase.

In order to reproduce a picture correctly on a matrix display panel, the television signal must be processed to meet the respective television system and a matrix display panel having a proper number of pixels for producing the prescribed number of scanning lines of the television system must be used. In general, a matrix display panel, with the number of pixels being set to suit the number of scanning lines of one system, cannot be used directly to display a picture of another system having a different number of scanning lines.

As a means of overcoming this situation, a circuit arrangement, described in Japanese Patent Publication No. 62-533989, for driving 240 scanning electrodes of a NTSC-based matrix panel includes a dummy flip-flop inserted in each of five-stage shift register groups connected to the scanning electrodes with the intention of displaying, by line extraction, a PAL-based picture having 287 scanning lines in each field. For a NTSC-based picture, the dummy flip-flops in the scanning electrode drive circuit are not used and the whole 240-stage shift register operates to display the picture.

An alternative sophisticated method is designed to store a picture in a memory temporarily and the number of scanning lines is converted through the video signal processing.

The above-mentioned conventional technology described in the patent publication 62-53989 necessitates a special scanning electrode drive circuit (will be termed "vertical scanning circuit" hereinafter) including dummy flip-flops. A usual vertical scanning circuit made up of simple shift registers without dummy flip-flops cannot display a picture formed of scanning lines more in number than the displayed scanning lines (number of vertical pixels) of the panel. The method of storing a picture temporarily in the memory for processing the video signal involves a large-scale circuit arrangement and it is not suitable for a compact planar television set or the like.

SUMMARY OF THE INVENTION

The present invention resides in a display apparatus using a matrix display panel, such as a liquid crystal panel, particularly with its number of scanning lines being converted so that the apparatus has the ability of conversion to a much larger number of scanning lines. Specifically, a usual vertical scanning circuit made up of a simple shift register is used with a sole additional provision of a circuit which deactivates the vertical registers temporarily at a certain interval within the effective scanning period, e.g., a circuit which removes vertical scanning shift clocks intermittently, so that a picture formed of an increased number of scanning lines can readily be displayed.

BRIEF DESCRIPTION OF THE DRAWINGS

FIG. 10b shows relation between signals R and Vc as shown in FIG. 10a;

FIG. 14 is a block diagram of the apparatus which employs a display panel of PDP, EL, or the like;

DESCRIPTION OF THE PREFERRED EMBODIMENTS

The apparatus is based on the operation in which vertical scanning shift clocks are removed intermittently so that the sequential selective output operation of the vertical scanning circuit halts and accordingly the video signals at horizontal clocks corresponding to the removed shift clocks do not contribute to the display operation, whereby the reduced scanning can readily be accomplished. In consequence, it becomes possible to display, for example, a PAL-based picture on a NTSC-based panel quite naturally.

An embodiment of the present invention will be described in detail with reference to the drawings.

Figure 1:
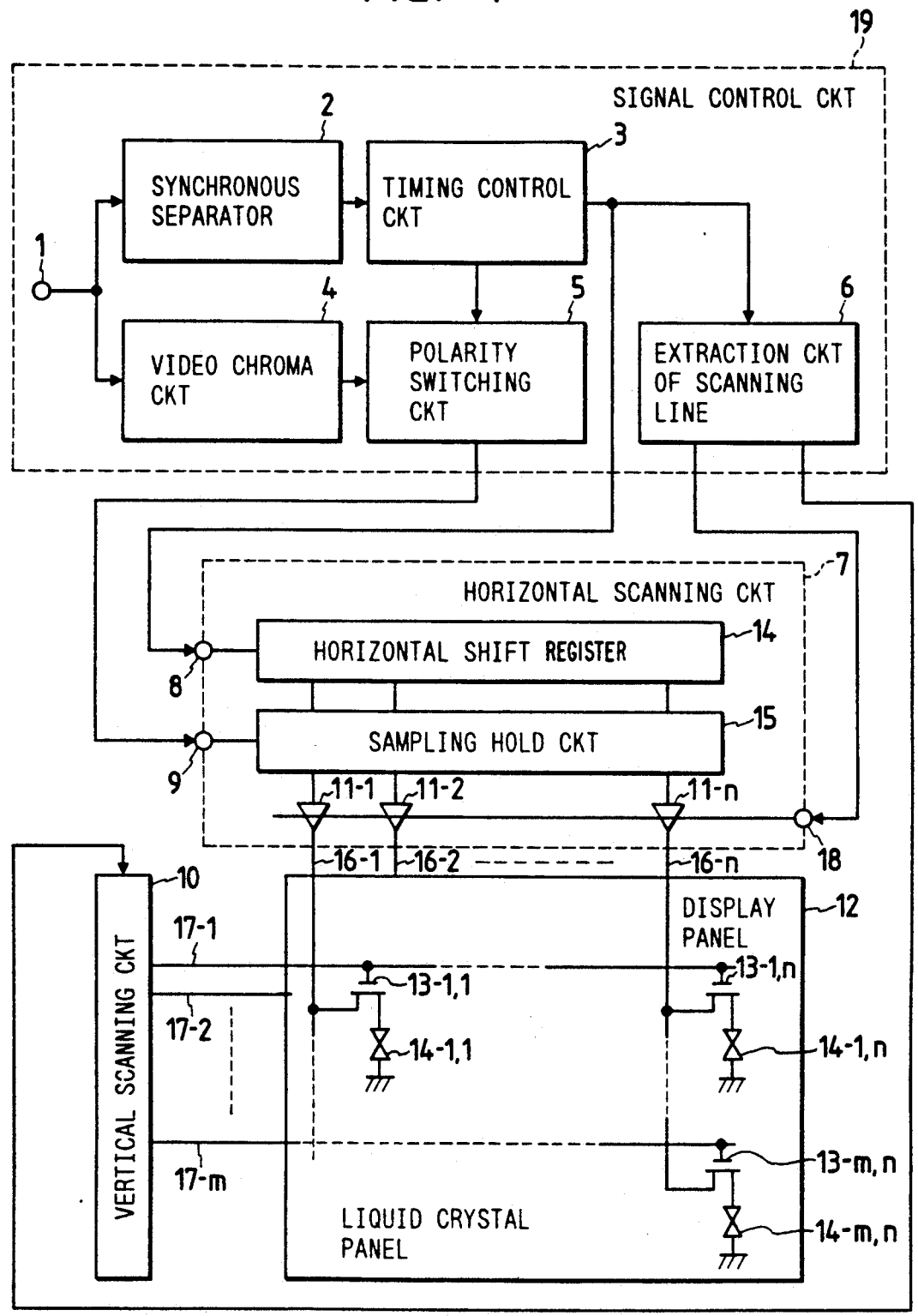
FIG. 1 is a block diagram of the display apparatus using a liquid crystal panel according to an embodiment of the present invention.

FIG. 1 shows an embodiment of the scanning conversion display apparatus of the present invention. The arrangement shown in block diagram in FIG. 1 is intended, as an example, to receive a video signal of PAL system and display a PAL-based picture on a liquid crystal panel based on the NTSC system different in the number of scanning lines from that of the video signal.

The arrangement of FIG. 1 comprises a signal control circuit 19, a horizontal scanning circuit 7, a vertical scanning circuit (vertical shift register) 10, and a liquid crystal panel 12. The signal control circuit 19 includes a video signal input terminal 1, a sync separation circuit 2, a timing control circuit 3, a video chroma circuit 4, a polarity switching circuit 5, and a line extraction circuit 6. The horizontal scanning circuit 7 includes a shift register 14 and an associated input terminal 8 for the shift clock and data signal, a sample-holding circuit 15 for the RGB video signal and an associated input terminal 9, and buffer amplifiers 11 of n in number for delivering the outputs of the sample-holding circuit and associated output terminals 18 of the output-enabled (OE) signals. The liquid crystal panel 12 includes horizontal scanning electrodes 16 of n in number, vertical scanning electrodes 17 of m in number, m-by-n pieces of thin film pixel transistors (TFT's) 13 with their drains and gates being driven selectively by the horizontal and vertical scanning electrodes 16 and 17, respectively, and liquid crystal pixels 14 connected to the sources of the pixel transistors.

The operation of the arrangement shown in FIG. 1 is as follows.

The sync separation circuit 2 separates the horizontal and vertical sync signals from the PAL signal received on the input terminal 1. Based on the horizontal and vertical sync signals, the timing control circuit 3 produces control signals necessary for the operation of the horizontal scanning circuit 7, vertical scanning circuit 10 and polarity switching circuit.

The video chroma circuit 4 produces a picture signal from the input video signal. The picture signal is a luminance signal for monochrome display, or it is RGB color signals for color display. This embodiment deals with color display, and the picture signal is the RGB color signals. The picture signal, after being switched for its polarity at a certain interval by the polarity switching circuit, is applied to the input terminal 9 of the sample-holding circuit 15.

In the horizontal scanning circuit 7, the horizontal shift register 14 operates in accordance with the control signal, and the sample-holding circuit 15 samples the picture signal on the terminal 9 in accordance with the outputs of the shift register 14 and holds the sampled data for a certain duration.

After picture signals for one line have been sampled, the outputs of the sample-holding circuit 15 are received by buffer amplifiers 11 (11-1, ..., 11-n), and their outputs are applied to the scanning electrodes 16 (16-1, 16-2, ..., 16-n) of the liquid crystal panel in response to the output enable (OE) signal applied to the control terminal 18 (this operation is called "line sequential drive).

The vertical scanning circuit 10 formed of a shift register drives the scanning electrodes 17 (17-1, 17-2, ..., 17-m) of the liquid crystal panel 12 in accordance with the control signal provided by the control circuit 3 by way of the line extraction circuit 6.

Among the pixel transistors 13 (13-1, 1; ...; 13-1, n) which drive the liquid crystal panel 12, when the i-th scanning electrode 17-i is scanned, n pieces of transistors 13-i, 1; ...; 13-i, n having their gates connected to that electrode turn on simultaneously. At this time, the picture signals held by the sampl-holding circuit 15 are applied to the signal electrodes 16 in synchronism with the OE signal on the output terminal 18 of the horizontal scanning circuit 7. Consequently, the sampled picture signals are written in the liquid crystal pixels 14-i, 1; ...; 14-i, n through the active pixel transistors 13-i, 1; ...; 13-i, n. Namely, picture information is written on the i-th line of the liquid crystal panel.

The operation of the line extraction circuit 6 in FIG. 1, which is an embodiment of this invention, will be explained in detail.

Figure 2:
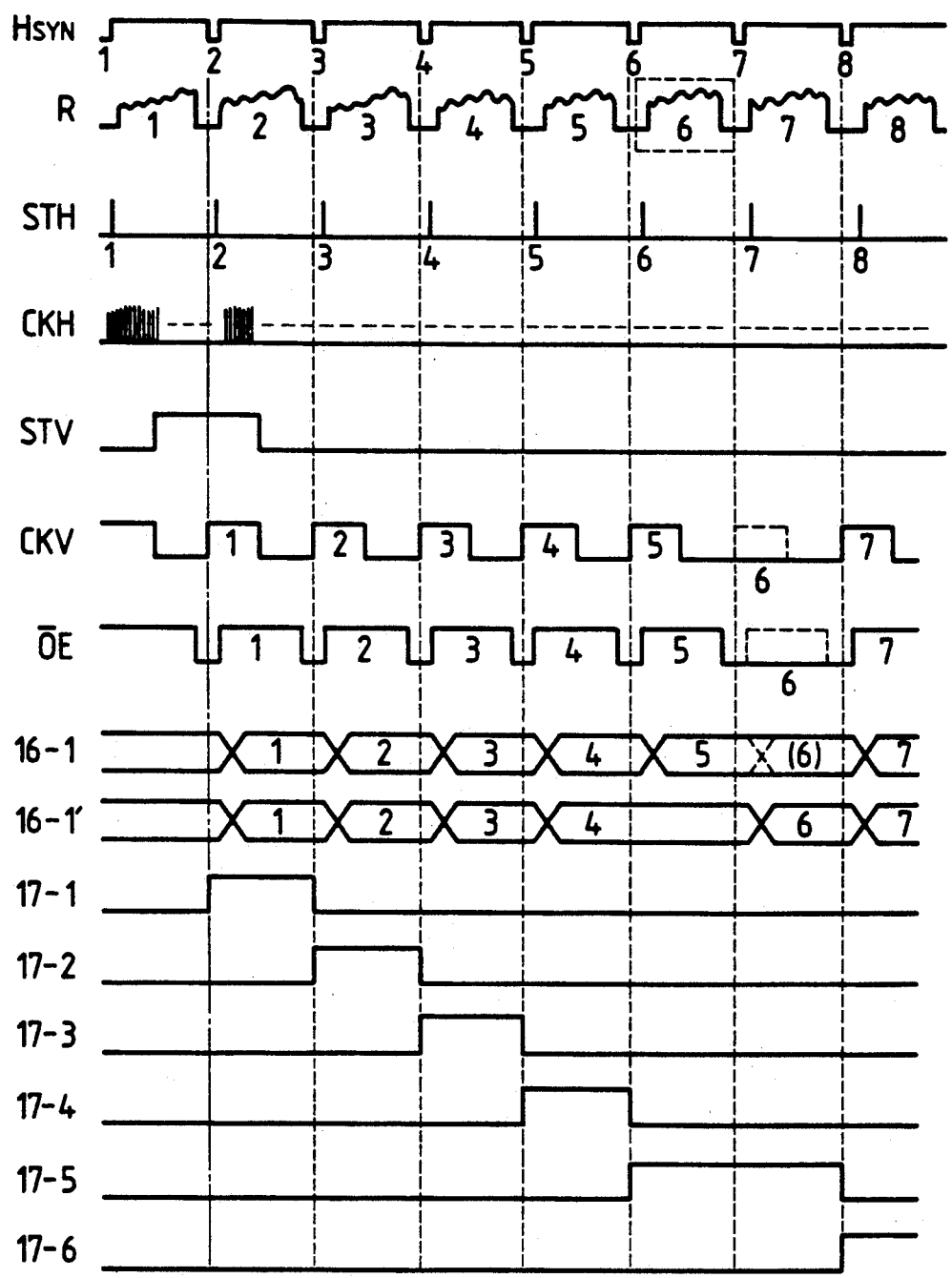
FIG. 2 is a waveform diagram showing the principal signals of the apparatus shown in FIG. 1.

FIG. 2 shows the waveforms of the signals that are essential for the operation of the circuit shown in FIG. 1. These signals include the horizontal sync signal Hsync, picture signal R, starting pulse STH for the horizontal shift register 14, horizontal shift register shift clock (equivalent to the sampling clock) CKH, starting pulse STV for the vertical scanning circuit 10, vertical scanning circuit shift clock CKV, and the above-mentioned buffer amplifier control signal OE.

Vertical scanning begins at the falling edge of the vertical shift clock CKV, with the shift register starting pulse STV in the vertical scanning circuit being applied. In FIG. 2, related signals are numbered (1-8) so as to clarify their relationship.

At the rising edge of the CKV pulse 1, the vertical shift register 10 produces at its first stage a scanning pulse to drive the first scanning electrode of the liquid crystal panel.

In response to the STH pulse 1 (the reference number is the signal number shown in the figure) which is synchronous with the Hsync pulse 1 in advance of the CKV pulse 1 by about one horizontal period, a picture signal R1 is sampled. The sampled data is released from a buffer amplifier 11 in response to the OE 1 which rises about one horizontal period later than the Hsync pulse 1, and it is written on the first line of the liquid crystal panel 12. The waveform of the signal electrode 16-1 is as shown by 16-1 in FIG. 2.

The line extraction circuit 6 shown in FIG. 1 removes one vertical shift clock CKV in every sixth CKV, e.g., CKV pulse 6 as shown in FIG. 2. Accordingly, the vertical shift register 10 does not operate in the time slot of the CKV pulse 6, but it stays unchanged when the CKV pulse 5 has been entered. Signals applied to the scanning electrodes 17 are selected sequentially as shown by the waveforms of 17-1, 17-2, 17-3, 17-4, 17-5 and 17-6 in FIG. 2. The selection of the fifth line of the liquid crystal panel 12 continues over the duration of the CKV pulse 6. The OE pulse 6 also stays inactive during that period, and the fifth picture signal is written and held on the fifth line. Although even the activation of the OE pulse 6 accomplishes the same effectiveness of this invention for reducing the picture size virtually uniformly for display, the picture information on the fifth line is replaced with the sixth picture signal. In case of extracting the OE pulse 5 in place of the OE pulse 6 in driving the signal electrode 16-1 by the waveform 16-1' in FIG. 2, the fourth pixel signal is initially written on the fifth line, and thereafter it is replaced with the sixth pixel signal. Any of these cases makes the following explanation complex, and therefore the extraction of the OE pulse 6 will be adopted in the following explanation. By extracting one pulse in every sixth CKV and OE, the picture signal of a corresponding one out of six scanning lines is not displayed on the liquid crystal panel.

Figure 15:
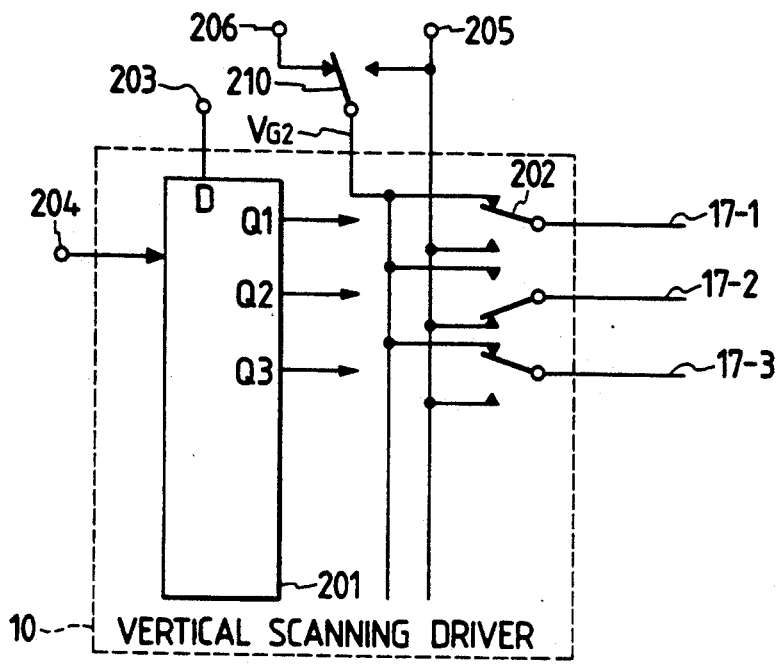
FIG. 15 is a block diagram showing the arrangement of the vertical scanning circuit.
Figure 16:
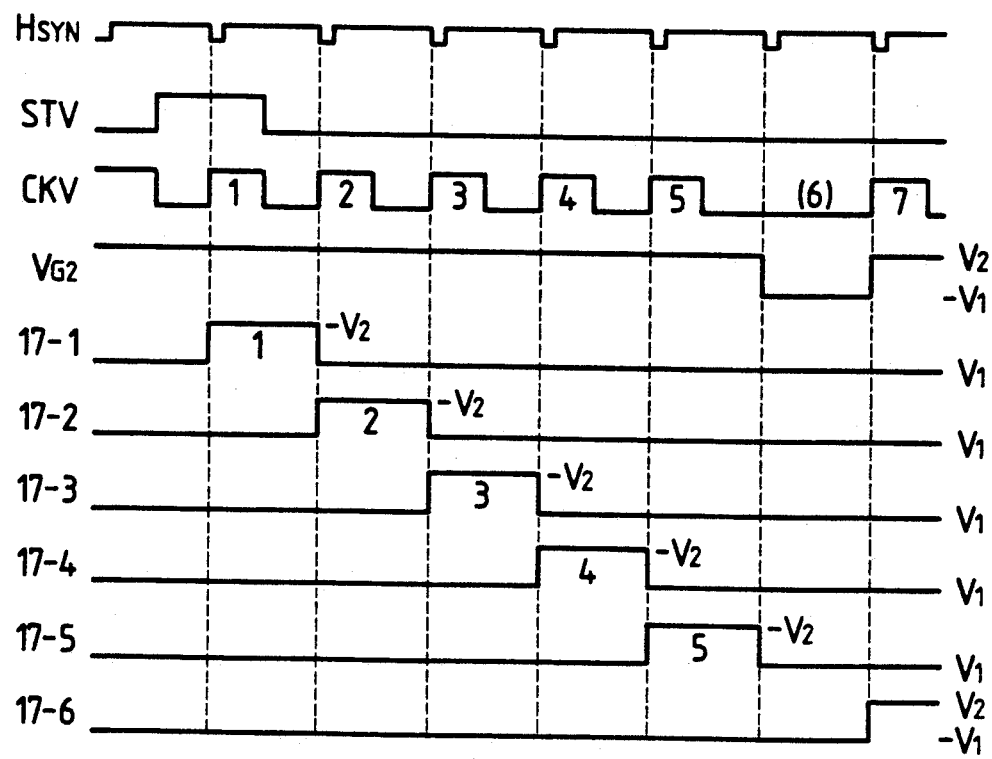
FIG. 16 is a waveform diagram for the circuit shown in FIG. 15.

In the above example of operation, it is conceivable that the duration of selecting the fifth scanning electrode 17-5 is about twice that of other electrodes, causing the unevenness of display. FIG. 15 shows an example of the circuit arrangement for overcoming this situation, and FIG. 16 shows the operational waveform. The portion in the dashed-line block 10 has the same function as of the vertical scanning circuit 10 of the embodiment shown in FIG. 1, and it comprises a shift register 201 and a set of selector switches 202. Further included in the arrangement are a vertical scanning starting terminal 203 to which the vertical starting pulse STV is applied, a vertical shift clock terminal 204 to which the vertical shift clock CKV is applied, a terminal 205 to which the scanning electrode non-selection voltage $V_1$ is applied, a terminal 206 to which the scanning electrode selection voltage $V_2$ is applied, and a voltage selector switch 210. The operation with the voltage selector switch being positioned as shown in FIG. 15 is identical to the case of the waveforms of FIG. 2. The difference from the operational waveform of FIG. 2 is that by controlling the circuit so that the switch 210 is reversed in the scanning period in which the vertical shift clock (e.g., sixth pulse) is extracted, the switch 210 delivers, as an output voltage $V_{G2}$, the scanning electrode non-selection voltage $V_1$ as shown in FIG. 16, causing the application of the non-selection voltage $V_1$ to all scanning electrodes 17-1~17-6 regardless of the state of the vertical scanning circuit 202, and the fifth scanning electrode 17-5 can have the duration of selection equal to that of other scanning electrodes.

Figure 3A:
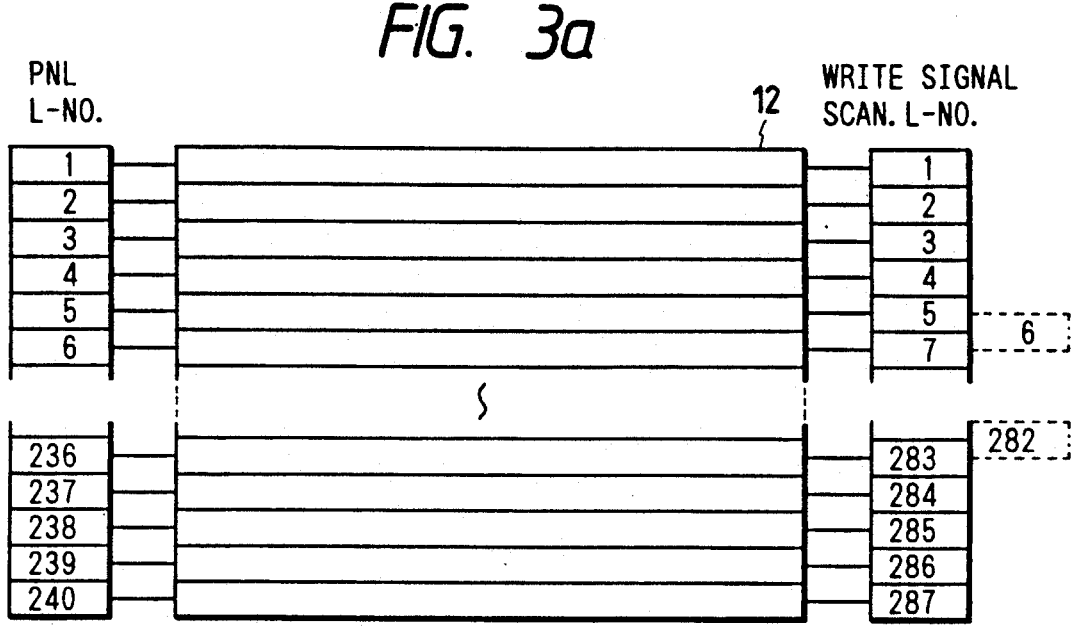
FIGS. 3a, 3b, 4a and 4b are diagrams each showing the relation between the panel line number and the scanning line of display video signal.
Figure 3B:
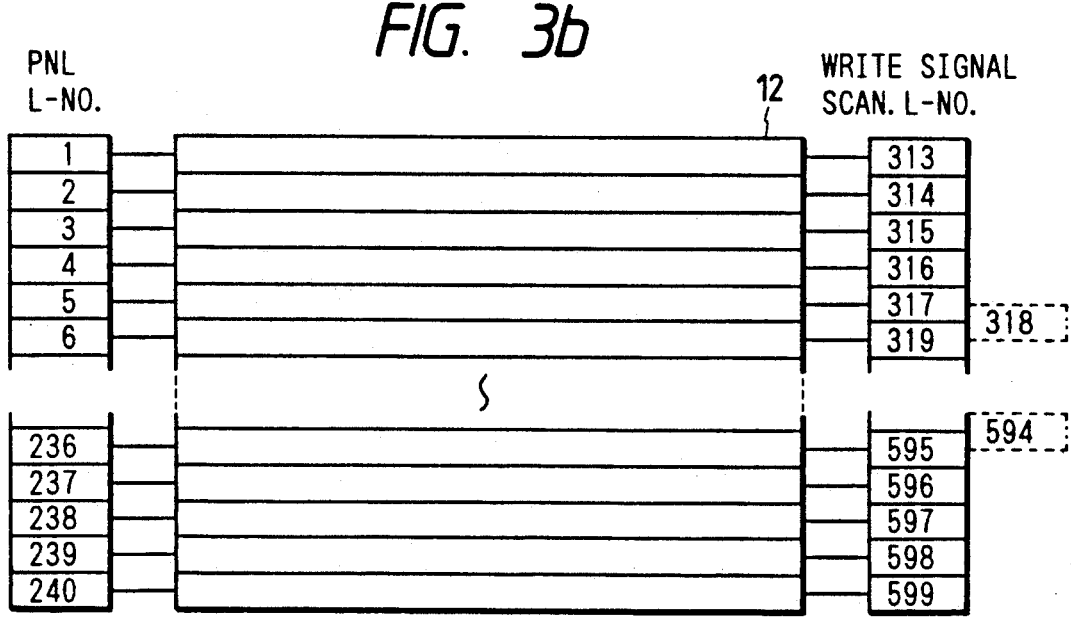

FIGS. 3a and 3b show the relation between the displayed scanning lines and the line number on the liquid crystal panel 12. FIG. 3a shows the relation during the display period of the odd field. The liquid crystal panel 12 has 240 pixels in the vertical direction, i.e., 240 scanning lines. The scanning lines which can be written on the liquid crystal panel 12 are numbered as indicated on the left side in FIG. 3a, and the scanning line number of the picture signal displayed on the liquid crystal panel 12 is indicated on the right side in FIG. 3a.

By extracting the vertical shift clock CKV and horizontal sampling output control signal OE by the line extraction circuit 6, as has been explained in connection with the waveforms of FIG. 2, five out of six picture signal scanning lines are written. Shown in the dashed-line boxes in FIG. 3a are numbers of scanning lines which are not displayed. As a result, the picture signal is displayed on the liquid crystal panel 12 of 240 lines, with one in every sixth scanning lines being extracted, and a picture which is reduced in the vertical direction is produced for the odd field made up of 287 scanning lines from the first to 287th lines as shown in FIG. 3a. Similarly, a picture which is reduced in the vertical direction is produced for the even field made up of 287 scanning lines from the 313th to 599th lines as shown in FIG. 3b.

Figure 4A:
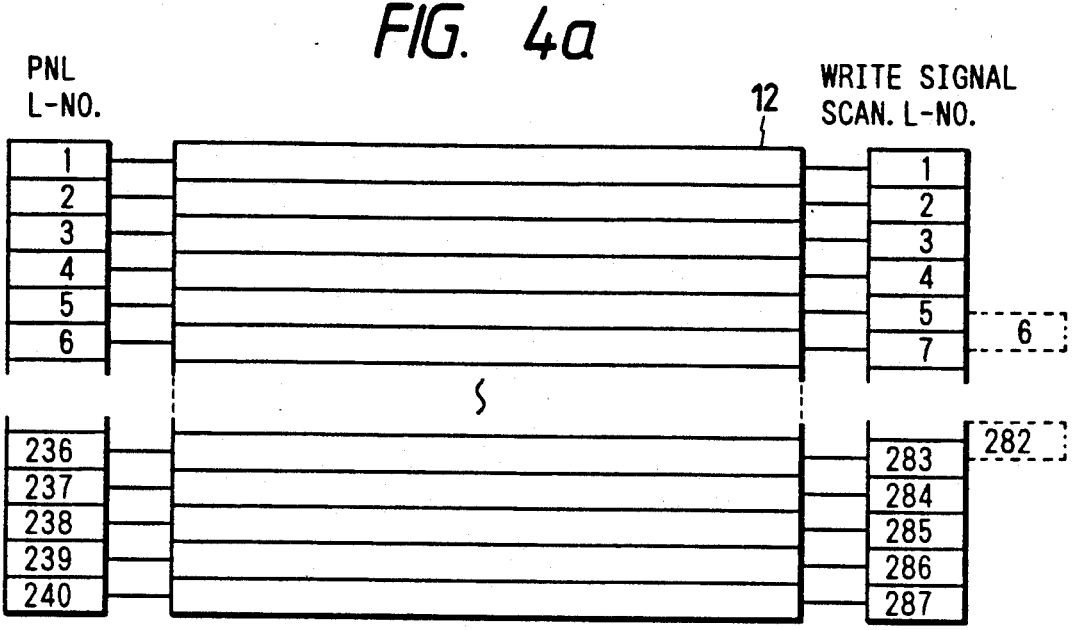
Figure 4B:
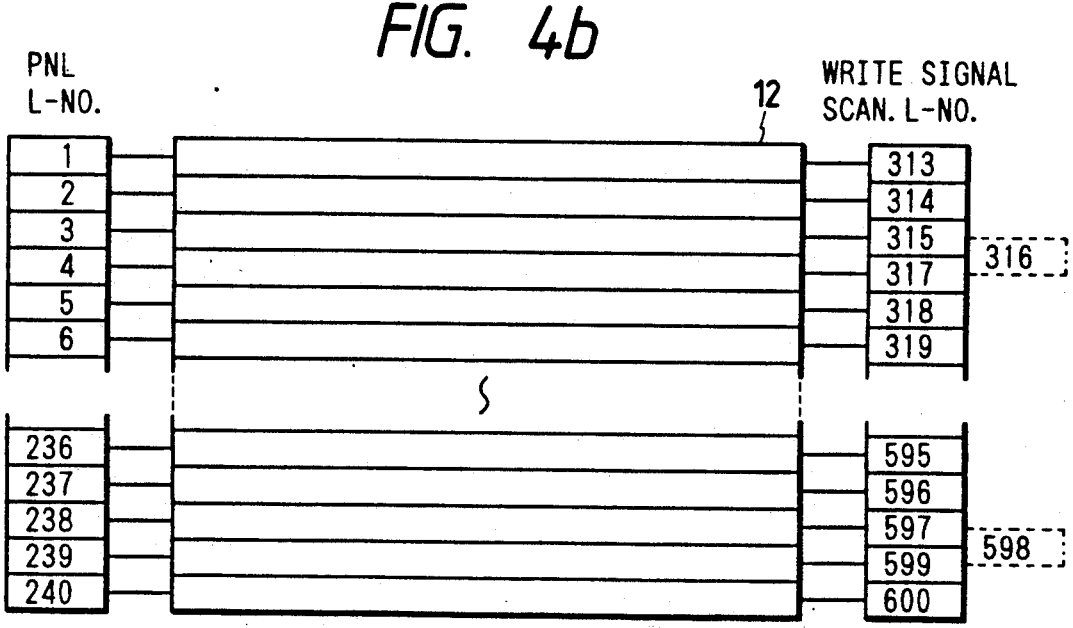

FIGS. 4a and 4b show the relation between the odd and even fields. This manner of line extraction is intended to produce a more natural display than the case of FIGS. 3a and 3b. In FIGS. 3a and 3b, picture signals of the same line numbers are removed in both the odd and even fields, whereas in FIGS. 4a and 4b, picture signals of different numbers are removed so that concentrative line extraction does not take place.

Generally, for a video signal of m scanning lines in correspondence to the display panel and a displayed video signal of n scanning lines, it is preferable to extract shift clocks at a rate of $(n-m)/n$ or at a rate of $1/k$ where $k=INT\{n/(n-m)\}$, and INT means integer of $n/(n-m)$. The liquid crystal panel 12 has an aspect ratio of 4:3, and the inventive apparatus is capable of displaying a PAL picture at the 4:3 aspect ratio by merely extracting shift clocks by using a vertical scanning circuit having a simple shift register function, instead of using a special vertical scanning circuit. The effectiveness of this invention is evident.

Figure 5:
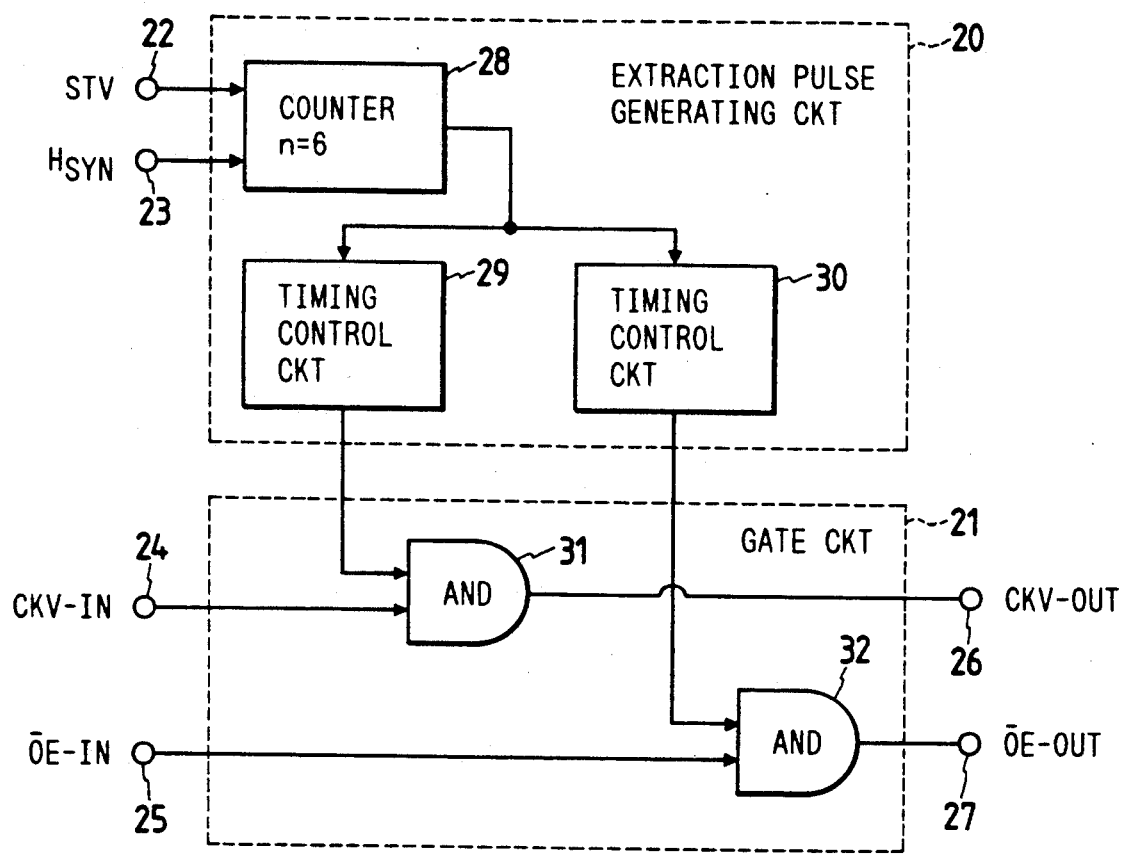
FIG. 5 is a schematic diagram showing a specific arrangement of the clock extraction circuit according to the present invention.

FIG. 5 shows as an example a specific circuit arrangement of the line extraction circuit 6. The circuit of FIG. 5 is made up of two major parts, which are an extraction pulse generation circuit 20 and a gate circuit 21. The extraction pulse generation circuit 20 includes a counter 28 and timing control circuits 29 and 30. The counter 28 counts horizontal sync signals Hsync on the terminal 23 in response to the STV applied to the terminal 22, and produces a pulse for every sixth Hsync. The timing control circuits 29 and 30 produce intended extraction pulses in response to the counter output pulse.

The gate circuit 21 includes two AND gates 31 and 32. The AND gate 31 gates the CKV received on the terminal 24 using the extraction pulse provided by the timing control circuit 29. The extraction pulse from the timing control circuit 29 has a negative polarity, and every sixth CKV pulse on the terminal 24 is removed and remaining pulses are delivered through the terminal 26. Similarly, every sixth OE pulse on the terminal 25 is removed, and remaining pulses are delivered through the terminal 27.

The waveforms of the output pulses are as shown in FIG. 2. The extraction pulse provided by the timing control circuit 29 has a period which covers the CKV pulse 6 shown by the broken line in FIG. 2, and the extraction pulse provided by the timing control circuit 30 has a period which covers the OE pulse 6 shown by the broken line in FIG. 2. In response to these extraction pulses, the gate circuit 21 produces the CKV and OE pulses shown in FIG. 2.

The foregoing is the first embodiment of this invention, in which the STV and OE pulses are extracted to halt vertical scanning. The polarity switching circuit 5 shown in FIG. 1 operates to write picture signals by reversing the polarity in alternate fields as in the conventional manner. Liquid crystal pixels have the application of signals which reverse the polarity at a certain interval, instead of having a d.c. voltage application, in principle. The reversing of the polarity of signals applied to the signal electrodes of the liquid crystal panel in alternate field periods is field-wise polarity reversing drive, and in this case of scanning the first embodiment has no problem. However, line-wise polarity reversing drive, in which the polarity of signals applied to the signal electrodes is reversed in alternate horizontal periods with the intention of preventing the flicker imposes a problem.

Figure 6:
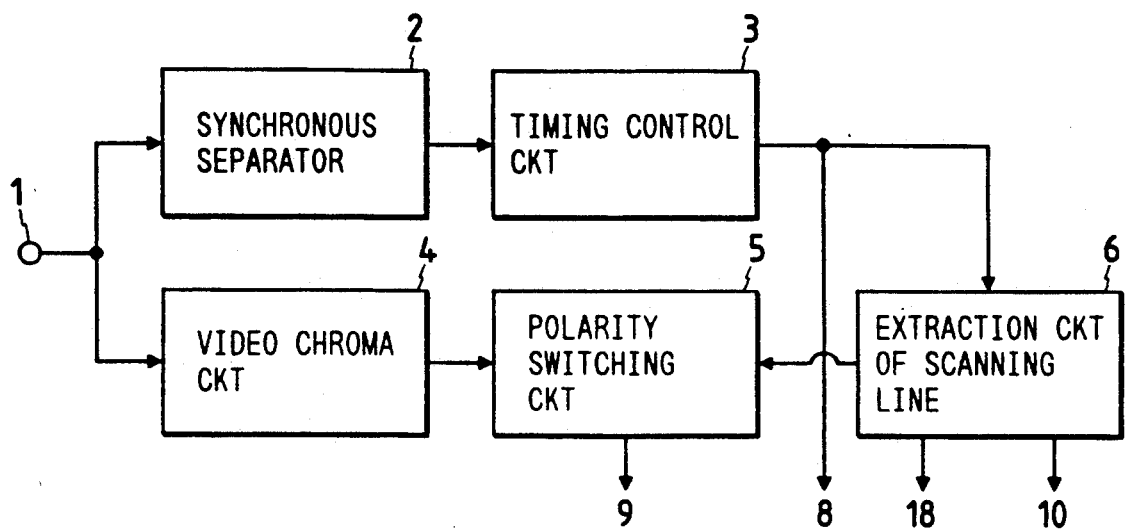
FIG. 6 is a block diagram of the circuit of the second embodiment of this invention which is intended to implement the line-wise polarity reversing drive.

FIG. 6 shows the circuit arrangement suitable for the line-wise polarity reversing drive, as the second embodiment of this invention. The arrangement shown in FIG. 6 corresponds to the signal control circuit 19 in FIG. 1. The arrangement of FIG. 5 is substantially identical to the signal control circuit 19 in FIG. 1, except that the polarity switching circuit 5 is controlled by the output of the line extraction circuit 6 in FIG. 5. In the line-wise polarity reversing drive, picture signals displayed on the liquid crystal panel 12 must have their polarity reversed for alternate lines. The normal operation of the polarity switching circuit 5 creates a shift in polarities of displayed picture signals at each halt of vertical scanning. In order to eliminate the shift, the operation of the polarity switching circuit 5 is also halted.

Figure 7:
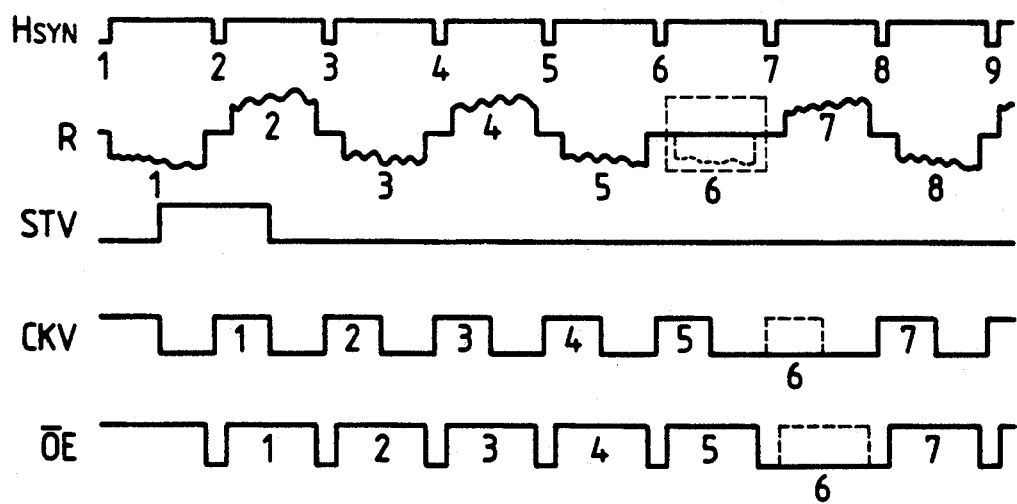
FIG. 7 is a waveform diagram showing the principal signals of the circuit shown in FIG. 6.

FIG. 7 shows the major waveforms during the line-wise polarity reversing drive. Each of the CKV and OE pulses is extracted in every sixth pulse, as in the case of FIG. 2. The difference from FIG. 2 is that picture signals R have their polarity reversed in alternate horizontal periods, the sixth picture signal which is not displayed on the liquid crystal panel 12 is zero, and the seventh and fifth signals have opposite polarities.

Since the OE pulse is also extracted, the sixth picture signal is not displayed, and therefore the sixth picture signal does not contribute to the display and is not required to be zero. In case the OE pulse is not extracted, the fifth picture signal is replaced with the sixth signal, and for this case a conceivable method of driving is to provide the same polarity for the fifth and sixth picture signals.

In any case, the arrangement of this embodiment controls the polarity switching circuit 5 concurrently to the extraction of the CKV and OE pulses so that picture signals having their polarity reversed for alternate lines is displayed on the liquid crystal panel 12, resulting in the normal line-wise polarity reversing drive.

When attention is paid only to the writing of an inverted signal to each liquid crystal pixel, it is not required for the line-wise polarity reversing drive to control the polarity switching circuit 5. The reason is that by reversing the phase of line-wise polarity reversal and writing signals with a polarity opposite to the odd field to alternate lines of the even field, signals with their polarity being reversed for alternate fields are applied to the liquid crystal pixels. However, in case the writing characteristics are different for the positive polarity and negative polarity, if signals with the same polarity are present on adjacent lines of the liquid crystal panel 12, a problem that only this portion is seen as a lateral stripe will arise. On this account, it is desirable in writing to control the polarity switching circuit so that the writing polarity reverses for alternate lines, as in the second embodiment of this invention.

The foregoing explanation is based on the condition that pixels connected to one signal electrode have the same color. But, there are cases in which pixels of different colors are connected. In such cases, it is recommended to use the color signal switching circuit in place of the polarity switching circuit 5 in FIG. 6 in the embodiment of the line-wise polarity reversing drive.

These are an embodiment of this invention in which the vertical scanning is halted temporarily during the drive. In the reality, however, a temporary halt of scanning can create a lateral stripe on the screen due to the variation in the effective values of picture signals applied to the liquid crystal pixels. To cope with this matter, it is necessary to alter the amplitude or d.c. level (black level) of the picture signal written on the lines where the lateral stripe appears. In practice, the creation of lateral stripe can be suppressed by merely controlling the black level.

Figure 8:
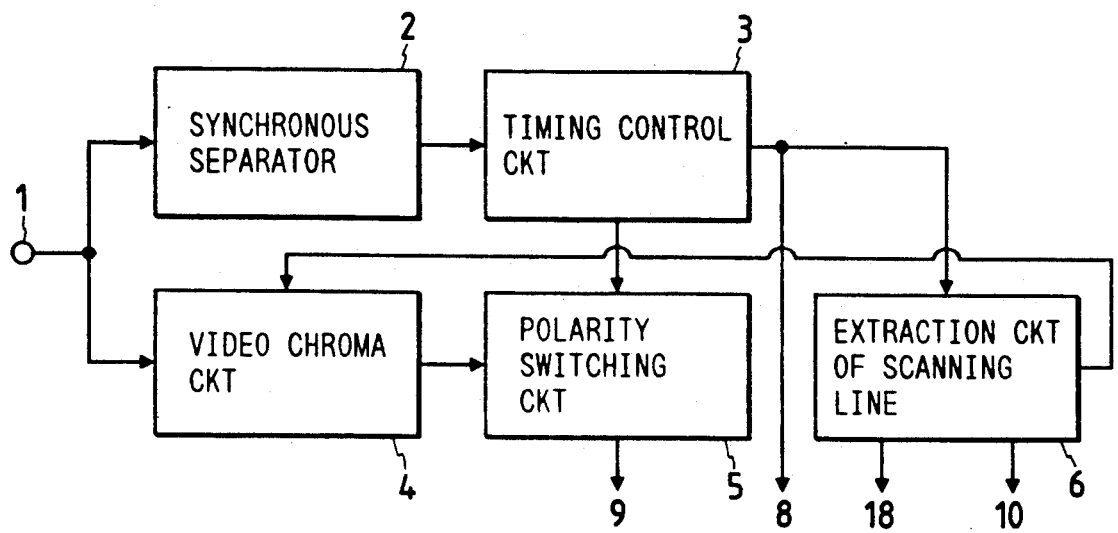
FIG. 8 is a block diagram of the circuit of the third embodiment of this invention which is intended to counteract the creation of lateral stripes.

FIG. 8 shows an embodiment of controlling the level of the picture signal in conjunction with the extraction of CKV and OE pulses. The circuit shown in FIG. 8 is equivalent to the signal control circuit 19 in FIG. 1, and it differs from the arrangement of FIG. 1 in the control of the video chroma circuit 4 using the output of the line extraction circuit 6.

Figure 9:
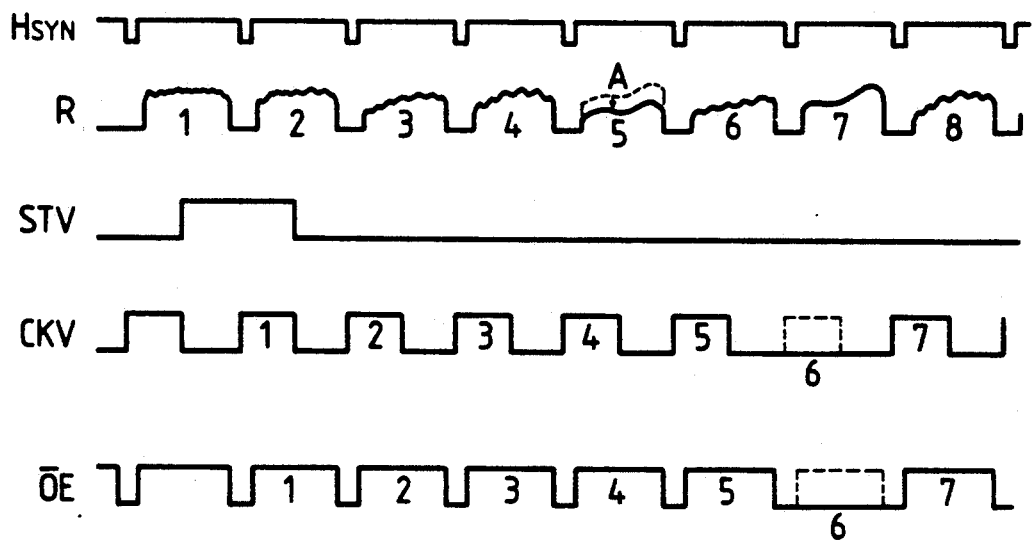
FIG. 9 is a waveform diagram showing the principal signals of the circuit shown in FIG. 8.

FIG. 9 is a waveform diagram showing the principal signals of the circuit shown in FIG. 8. For example, in FIG. 9, a picture signal on a scanning line preceding by two horizontal scanning period from the time slot of CKV and OE extraction has its level varied as shown by the dashed-line relative to those shown by the solid line, thereby varying the intensity of lateral stripe and making it less noticeable.

Figure 10A:
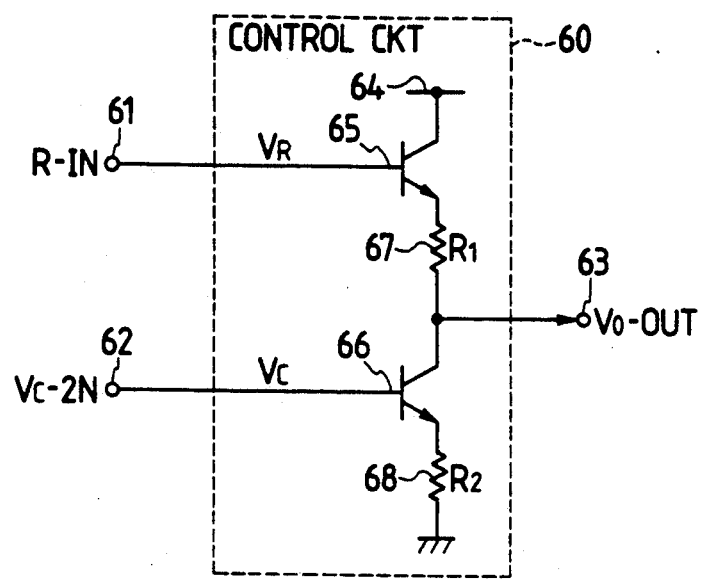
FIGS. 10a, 11, 12 and 13 are diagrams showing the control of the RGB color signals
Figure 10B:
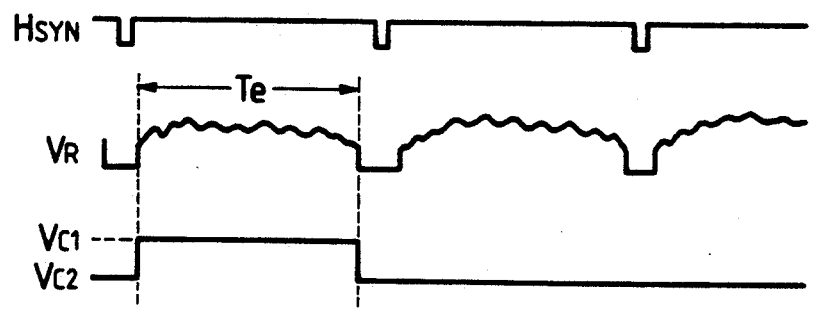

FIGS. 10a and 10b show a specific example of varying the picture signal level. FIG. 10a is an example of the control circuit 60 for varying the picture signal level. The control circuit 60 is a subtraction circuit comprising transistors 65 and 66, resistors 67 and 68 and a power supply terminal 64, and it further includes an input terminal 61 for the picture signal, a control terminal 62 and an output terminal 63.

FIG. 10b shows the Hsync-based relation between the picture signal R and the control signal $V_C$. The control signal is basically a pulse signal having the same width as of the effective display period Te of the picture signal. The signal $V_C$ has a low level of $V_{C2}$ and a high level of $V_{C1}$.

In FIG. 10a, the transistor 65 receives on its base terminal (input R-IN) the picture signal R having a voltage level of $V_R$. The transistor 66 receives on its base terminal (input $V_C$-IN) the control signal having a voltage level of $V_C$. With the resistor elements 67 and 68 having resistance values of R1 and R2, respectively, the subtraction circuit shown in FIG. 10a produces an output $V_O$ which can be expressed as follows.

$$V_O=(V_R-V_{BE})-(V_C-V_{BE}) \cdot R1/R2 \tag{1}$$

where $V_{BE}$ is the transistor base-emitter voltage. By choosing the resistors so that $R_1=R_2$ the equation (1) is reduced to as follows.

$$V_O=V_R-V_C \tag{2}$$

At the application of the pulse of FIG. 9 (b), $$V_O=V_R-V_{C1} \tag{3}$$

In the absence of the input,
$$V_O=V_R-V_{C2} \tag{4}$$

In order for the control circuit 60 to operate normally, at least the following conditions must be met.

$$V_R>V_C+V_{BE} \text{ and } V_C>V_{BE} \text{ and } V_O>V_C$$

The equations (3) and (4) reveal that the $V_O$ level can be controlled by the amplitude of the control signal $V_C$, and the black level of the picture signal can be made variable.

The foregoing is an embodiment of the circuit for varying the black level of one picture signal. This method is applicable extensively to a display panel including a color display.

Figure 11:
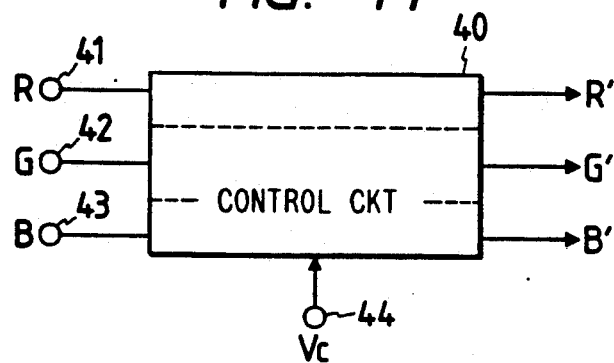

FIG. 11 shows an example of the circuit for controlling the black level of three RGB color signals. The control circuit 40 is formed of a parallel connection of three control circuits 60 shown in FIG. 10a, and the RGB color signals are applied to the picture signal input terminals 41, 42 and 43 of the respective circuits. The circuits have a common terminal 44, to which the control signal $V_C$ is applied, and they produce color signals R', G' and B' with the black level thereof being equally controlled.

Figure 12:
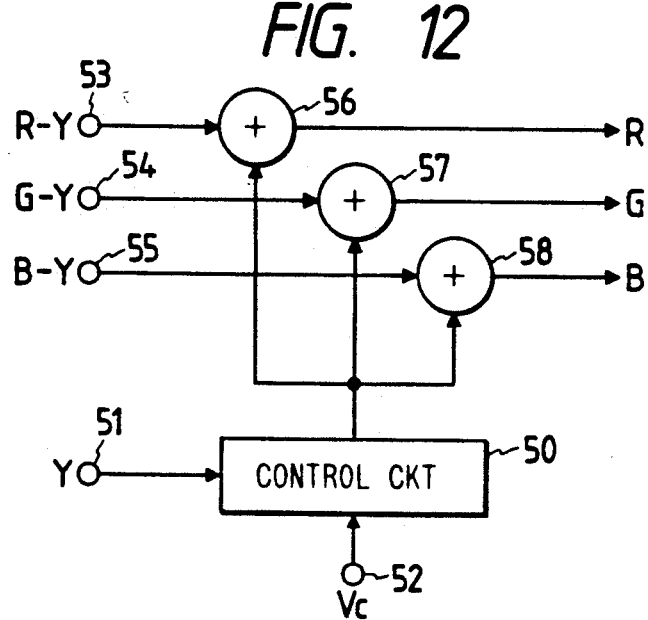

FIG. 12 shows the arrangement in which the chrominance signal Y is added to the color difference signals R-Y, G-Y and B-Y to form the RGB color signals, with the black level of the Y signal being controlled so that the black level of the RGB signals is controlled in consequence. The circuit comprises input terminals 53, 54 and 55 for the color difference signals R-Y, G-Y and B-Y, adders 56, 57 and 58, a control circuit 50, an input terminal 5 for introducing the luminance signal Y to the control circuit 50, and an input terminal 52 for the control signal $V_C$.

The luminance signal Y received by the control circuit 50 has its black level controlled in response to the control signal $V_C$, and thereafter it is added to the color difference signals R-Y, G-Y and B-Y by the adders 53, 54 and 55, respectively. Accordingly, by merely controlling the luminance signal Y, the single circuit can control the three RGB color signals.

Figure 13:
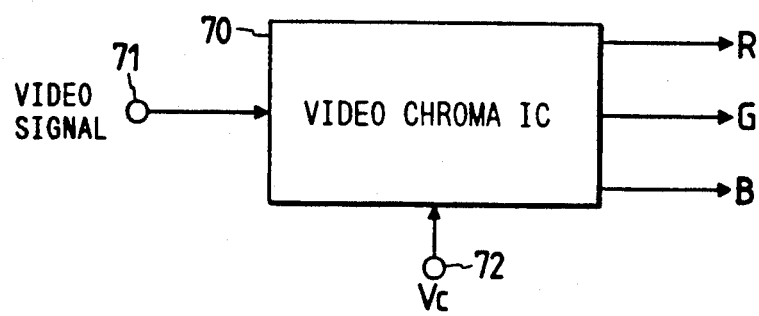

FIG. 13 shows the arrangement for controlling the RGB color signals by applying the control signal to the black level control terminal 72 of the video chroma IC 70. A terminal 71 is a video signal input terminal which is led to the video chroma IC 70.

Any of the above-mentioned arrangements is capable of controlling the black level of the RGB color signals, and the creation of a lateral stripe due to the temporary halt of vertical scanning can be alleviated even for color display.

Another conceivable method for the lateral stripe suppression is the amplitude control of the picture signal. The above explanation is useful also in this case through the use of multipliers in place of the adders. The control signal to the video chroma IC is applied to the contrast control terminal in this case.

The foregoing is the case of driving an active matrix liquid crystal panel based on the line sequential scanning. There are a variety of driving systems for the liquid crystal panel, and in any case a PAL-based picture can readily be displayed at a correct aspect ratio on a NTSC-based panel by halting the vertical scanning intermittently, as shown in the foregoing embodiments of this invention. By halting the vertical scanning, either the OE signal or polarity reversing signal is controlled in accordance with the driving system.

The foregoing is the explanation of displaying a PAL-based picture on a NTSC-based panel. In general, in displaying a picture having effective scanning lines of n in number on a display panel having displayed scanning lines of m in number, the embodiments of this invention can be applied when the condition $n > m$ is met. The optimal interval of halting the vertical scanning is chosen in accordance with the ratio of m to n. The vertical scanning halt interval is not required to be constant, but the halt can take place at properly different time points, instead of a concentrative time point, within the effective scanning period.

Although the foregoing embodiments use a liquid crystal panel for the display panel, the present invention can readily be applied also to a PDP (plasma display panel), EL (electroluminescence) panel, etc. in which a shift register performs the vertical scanning of the display panel.

Figure 14:
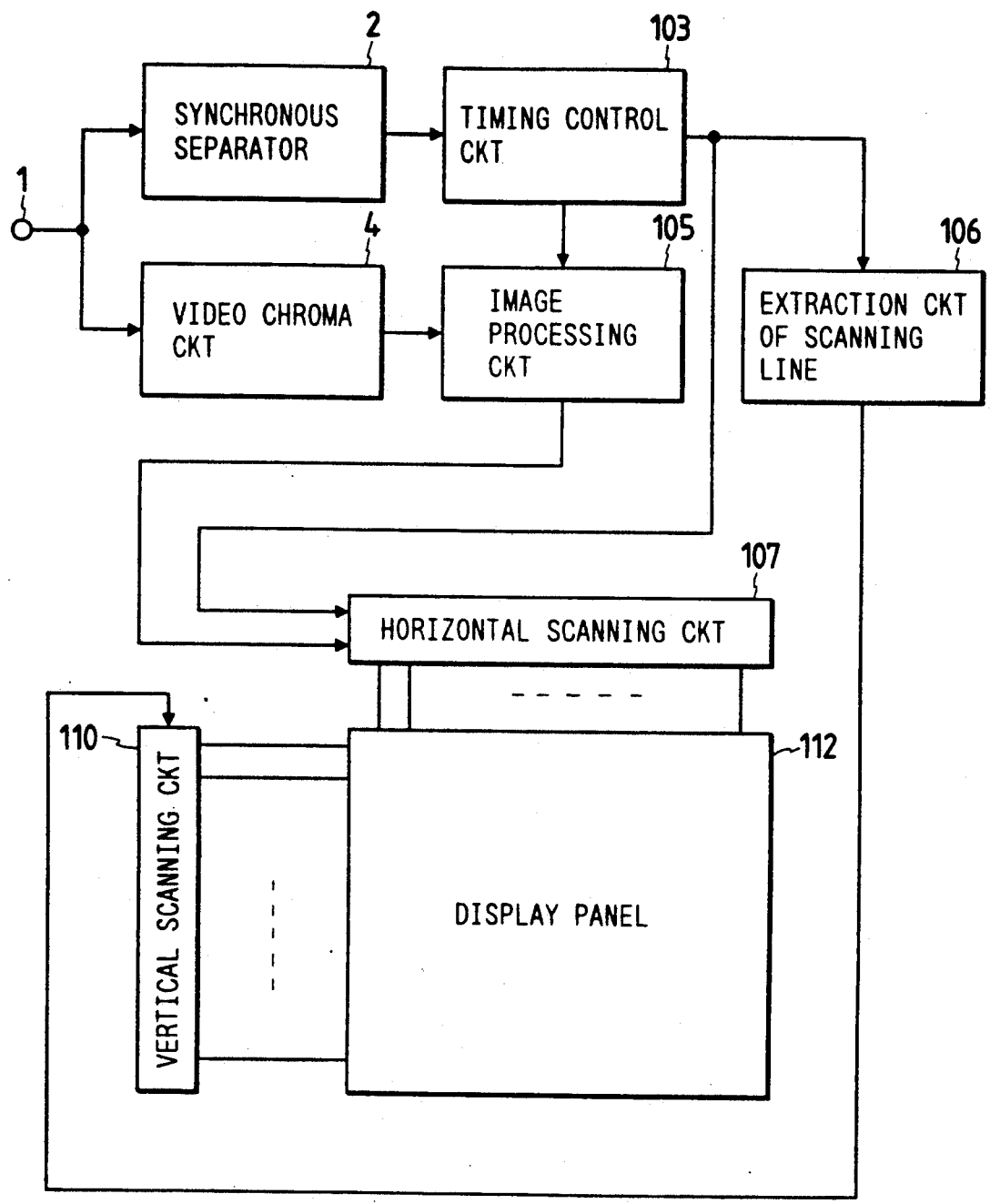

FIG. 14 is a block diagram of this invention using a PDP or EL panel. The block diagram of FIG. 14 is derived from the block diagram of FIG. 1, with the liquid crystal panel 12 being replaced with a PDP or EL display panel 112. In addition, the polarity switching circuit 5 in FIG. 1 is replaced with a picture signal processing circuit 105 so that pictures can be displayed on the display panel 112 which is different from the liquid crystal panel. The timing control circuit 103, line extraction circuit 106, horizontal scanning circuit 107 and vertical scanning circuit 110 in FIG. 14 have the same functions as of the timing control circuit 3, line extraction circuit 6, horizontal scanning circuit 7 and vertical scanning circuit 10 in FIG. 1. Accordingly, the operation and the effectiveness of this invention based on the arrangement of FIG. 14 are identical to the case of FIG. 1, except for the use of the display panel 112 and picture signal processing circuit 105, and explanation thereof will not be repeated. FIG. 15 shows a block diagram showing the arrangement of the vertical scanning circuit and FIG. 16 shows a waveform diagram for the circuit shown in FIG. 15.

Figure 17:
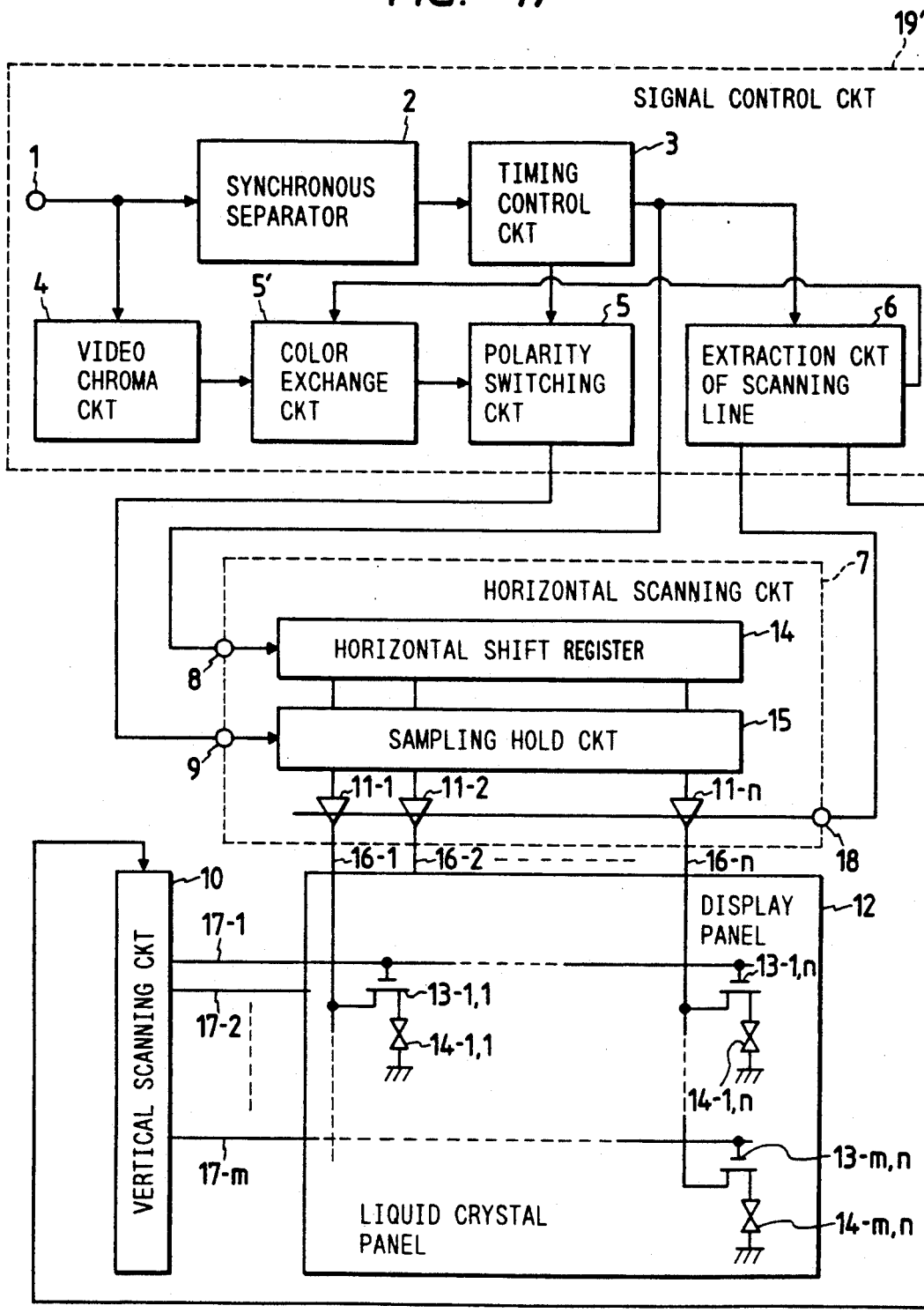
FIG. 17 is a block diagram showing another embodiment of the display apparatus using a liquid crystal panel according to the present invention.

The foregoing description for the embodiment of the liquid crystal panel did not mention the color arrangement of pixels. For example, in case of displaying different colors on each line by using the pixel transistors 13-1, 1; ... ; 13-1, n; ... ; 13-n, 1; ... 13-n, n in connection with the horizontal scanning electrodes 16-1 to 16-n which forms the liquid crystal panel 12 shown in FIG. 17, it is necessary to apply color signals different for each line to the horizontal scanning electrodes 16-1 to 16-n. In this case, a color switching circuit 5' is provided to implement the line-wise color switching. The color switching takes place sequentially for each line, and therefore if only vertical scanning is suspended, the order of color writing which corresponds to the lines will be lost. This impropriety is prevented in the embodiment of FIG. 17 by controlling the color switching circuit 5' in synchronism with the extracting operation. The arrangement of FIG. 17 differs from FIG. 1 in the addition of the color switching circuit 5', and the remaining portions and the effectiveness are identical to the case of FIG. 1.

As described above for the embodiments of this invention, it is possible to display on a NTSC-based panel a PAL-based picture, which is larger in the number of scanning lines than the NTSC-based panel, at the normal aspect ratio by using a vertical scanning circuit formed of a simple shift register, instead of using a special vertical scanning circuit having dummy flip-flops, and the inventive arrangement provides the effectiveness of displaying on a display panel having a smaller number of display scanning lines a picture consisting of scanning lines larger in number than the display panel.

Another effectiveness is that by controlling the picture signal, the creation of a lateral stripe caused by the halt of vertical scanning can be suppressed.

What is claimed is:

1. A scanning conversion display apparatus comprising:
    a video signal processing circuit which processes an input video signal to produce picture signals;
    a control circuit which produces control signals in synchronism with the input video signal;
    a horizontal scanning circuit and a vertical scanning circuit each being provided with a shift register controlled by said control circuit; and
    a display panel formed of a matrix arrangement of pixels which are written with said picture signals by being selected by said horizontal scanning circuit and said vertical scanning circuit;
    wherein said apparatus further comprises:
    a circuit which intermittently removes vertical shift clocks operating said shift register in said vertical scanning circuit, within the effective display period of said picture signals, and
    an amplifier circuit having a different rate of amplification and a different DC component or either one of them during said intermittent period or a control period before some lines of said intermittent period, and having a width equal to said intermittent period, said amplifier circuit controls an amplitude and a DC level of said video signal written into said pixels of said display panel.

2. A scanning conversion display apparatus comprising:
- a video signal processing circuit which processes an input video signal to produce picture signals;
- a polarity inversion circuit for periodically changing-over a polarity of said picture signals;
- a control circuit which produces control signals in synchronism with the input video signal;
- a horizontal scanning circuit and a vertical scanning circuit each including a shift register operated by said control circuit; and
- a display panel formed of a matrix arrangement of liquid crystal pixels which are written with the picture signals having polarity changed over in a period of every vertical shift clock by being selected and driven by said horizontal scanning circuit and vertical scanning circuit;

wherein said apparatus further comprises:
- a circuit which intermittently removes vertical shift clocks of said vertical scanning circuit within the effective display period of said picture signals,
- a first means for temporarily stopping said polarity inversion operation only for said intermittent period or a period equal to said intermittent period before some lines of said intermittent period;
- a second means for amplifying said video signal at a different rate of amplification and a DC component or either one of them for a period for performing said intermittent operation or for a period equal to said intermittent period before some lines of said period;

wherein at least one of said first means or said second means is operative.

3. A scanning conversion display apparatus comprising:
- a video signal processing circuit which processes an input video signal to produce picture signals;
- a control circuit which produces control signals in synchronism with an input video signal;
- a horizontal scanning circuit and a vertical scanning circuit each including a shift register operated by said control circuit; and
- a display panel formed of a matrix arrangement of pixels which are written with said picture signals by being selected by said horizontal scanning circuit and vertical scanning circuit;

wherein said apparatus further comprises:
- a circuit which intermittently removes vertical shift clocks, which operate said shift register in said vertical scanning circuit, within the effective display period of said video signal, and
- means for arranging output pulse widths of said shift register in said vertical scanning circuit, within said intermittent period in a specified value and making each selective period of one of a plurality of vertical scanning electrodes connected between said vertical scanning circuit and said display panel to be equal to each other.

4. A scanning conversion display apparatus according to claim 3 further comprising:
- wherein said display panel is a liquid crystal panel on which the displayed color of pixels driven by a same horizontal scanning electrode varies for each line;
- a color switching circuit which switches color signals to be written to said liquid crystal panel; and
- means for controlling said color switching circuit in synchronism with the intermittent operation of said vertical shift register.

* * * * *